United States Patent
Maksimovic et al.

(10) Patent No.: US 11,910,102 B1
(45) Date of Patent: Feb. 20, 2024

(54) OPTICAL ELEMENTS FOR ENHANCED LIGHT IN-COUPLING IN FIBER-COUPLED IMAGERS

(71) Applicant: Apple Inc., Cupertino, CA (US)

(72) Inventors: Milan Maksimovic, Sunnyvale, CA (US); Miodrag Scepanovic, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/389,262

(22) Filed: Jul. 29, 2021

Related U.S. Application Data (60) Provisional application No. 63/059,050, filed on Jul. 30, 2020.

(51) Int. Cl.
| | | |
|---|---|---|
| *H04N 23/75* | (2023.01) | |
| *G02B 27/00* | (2006.01) | |
| *G02B 6/26* | (2006.01) | |
| *G02B 27/42* | (2006.01) | |

(52) U.S. Cl.
CPC ............. *H04N 23/75* (2023.01); *G02B 6/262* (2013.01); *G02B 27/0037* (2013.01); *G02B 27/4205* (2013.01)

(58) Field of Classification Search
CPC ........ H04N 5/238; H04N 23/75; G02B 6/262; G02B 27/0037; G02B 27/4205
See application file for complete search history.

(56) References Cited

U.S. PATENT DOCUMENTS

| | | | | |
|---|---|---|---|---|
| 5,004,328 A | * | 4/1991 | Suzuki | H04N 9/04517 |
| | | | | 359/664 |
| 7,366,376 B2 | | 4/2008 | Shishkov et al. | |
| 8,488,257 B2 | * | 7/2013 | Stark | G02B 13/06 |
| | | | | 348/36 |
| 9,398,202 B2 | * | 7/2016 | Ishihara | G02B 6/06 |
| 9,860,443 B2 | | 1/2018 | Ford et al. | |
| 10,682,044 B2 | | 6/2020 | Wu et al. | |
| 2015/0116553 A1 | * | 4/2015 | Ford | F24S 23/30 |
| | | | | 348/262 |
| 2015/0207990 A1 | * | 7/2015 | Ford | G02B 13/06 |
| | | | | 348/262 |

FOREIGN PATENT DOCUMENTS

| | | | |
|---|---|---|---|
| JP | 2005-338341 | * | 12/2005 |
| JP | 4574229 | | 11/2010 |

* cited by examiner

*Primary Examiner* — Luong T Nguyen
(74) *Attorney, Agent, or Firm* — Robert C. Kowert; Kowert, Hood, Munyon, Rankin & Goetzel, P.C.

(57) ABSTRACT

An optical image system may include a monocentric lens optically coupled to a fiber bundle and an image sensor. The fiber bundle may provide a curved face towards the monocentric lens and a flat face towards an image sensor. The fiber bundle may transfer light passing through the monocentric lens to the image sensor. The optical image system may include an optical correction structure having a diffractive optical element (DOE), which may be located between the monocentric lens and the fiber bundle. The optical correction structure may increase light in-coupling between the monocentric lens and fiber bundle by reducing or eliminating light reflection at the curved face of the fiber bundle.

18 Claims, 7 Drawing Sheets

OPTICAL ELEMENTS FOR ENHANCED LIGHT IN-COUPLING IN FIBER-COUPLED IMAGERS

BACKGROUND

This application claims benefit of priority to U.S. Provisional Application Ser. No. 63/059,050, filed Jul. 30, 2020, entitled "Optical Elements for Enhanced Light In-Coupling in Fiber-Coupled Imagers", which is hereby incorporated by reference herein in its entirety.

TECHNICAL FIELD

This disclosure relates generally to optical image systems, in particular, optical image systems that may include optical elements to enhance light in-coupling in wide-angle monocentric fiber-coupled imagers.

DESCRIPTION OF THE RELATED ART

The advent of mobile multipurpose devices such as smartphones, tablet, pad, or wearable devices has created a need for optical image systems capable of capturing high quality wide-angle images. Such optical image systems generally use large lenses to capture a wide range, which can result in large sizes. However, the optical image systems need to have small form factors in order for integration in cameras of the devices. Thus, it is desirable for an optical image system which can have a small volume but still provide a large field of view and light collection.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to an optical image system which may include an optical element for enhancing light collection in the optical image system. In some embodiments, the optical image system may include one or more curved lenses comprising a curved image surface, e.g., monocentric lenses which may include one or more ball lens having a common symmetry center. The usage of monocentric lenses may provide the ability to capture images in a wide angle. The monocentric lenses may receive light from an external environment, pass it through, and focus the light on to a curved image surface or image focus plane, e.g., an approximately spherical image surface. In some embodiments, the optical image system may further include a fiber bundle. The fiber bundle may include one or more sub-bundles each of which may comprise one or more optical fibers. The fiber bundle (and its sub-bundles) may be structured so as to from a fiber faceplate having a curved face towards the monocentric lenses and an approximately flat face towards an image sensor. In some embodiments, the curved face of the fiber bundle may be conformal to the curved image surface of the monocentric lenses. Therefore, the fiber bundle may receive the light passing through the monocentric lenses and transfer the light to the image sensor which may have an approximately flat surface. The fiber bundle may thus serve as the link to transfer light out of the curved monocentric lenses to the flat image sensor.

In some embodiments, the light in-coupling between the monocentric lenses and the fiber bundle may be subject to total internal reflection (TIR). TIR may occur when the incident angle of light is close to or greater than a certain limiting angle, called the critical angle. An incident angle refers to the angle between the light incident on a surface and the line (called the normal) perpendicular to the surface at the point of incidence. As described below, this phenomenon may occur in an outer region or perimetric region of the curved face of the fiber bundle where the corresponding light may have a large incident angle. The TIR may cause light to be reflected from the curved face of the light bundle rather than enter the fiber bundle, reducing the amount of light transferred by the fiber bundle to the image sensor and thus reducing the field of view and/or image quality.

In some embodiments, the optical image system may include at least one optical correction structure to mitigate or eliminate the TIR and enhance the light in-coupling between the monocentric lenses and fiber bundle. In some embodiments, the optical correction structure may include a curved shell having a surface that may be conformal to the curved image surface of the monocentric lenses. The optical correction structure may be inserted between the monocentric lenses and the fiber bundle. In some embodiments, the optical correction structure may include a diffractive optical element (DOE), e.g., on at least one side of the optical correction structure that may face the monocentric lenses. The DOE may diffract to bend the light coming out of the monocentric lenses to the fiber bundle, which may reduce the incident angle of the light with respect to the curved face of the light bundle (e.g., to make the light to become more perpendicular to the curved face of the fiber bundle) and thus mitigate or eliminate the light reflection. As described above, the TIR may take place at a certain region, e.g., the outer or perimetric region, of the fiber bundle where the light in this region may have a large incident angle, and the other region, e.g., the central region or a region near the center, of the fiber bundle may not necessarily be prone to the TIR because the incident angle of the corresponding light may be less than the critical angle. Thus, in some embodiments, the DOE may be located at a partial region, e.g., the outer region, of the optical correction structure corresponding to the TIR-vulnerable area of the fiber bundle. Alternatively, in some embodiments, the optical correction structure may include a hole at the central region such that the light may come out of the monocentric lenses directly to the fiber bundle (without diffraction), and the DOE may be applied to the rest of the curved surface of the optical correction structure such that only light arriving at those regions may be diffracted by the DOE. The optical image system disclosed herein may be part of a camera of a mobile multi-purpose device, e.g., a smartphone, tablet, pad, or wearable device.

Figure 1:
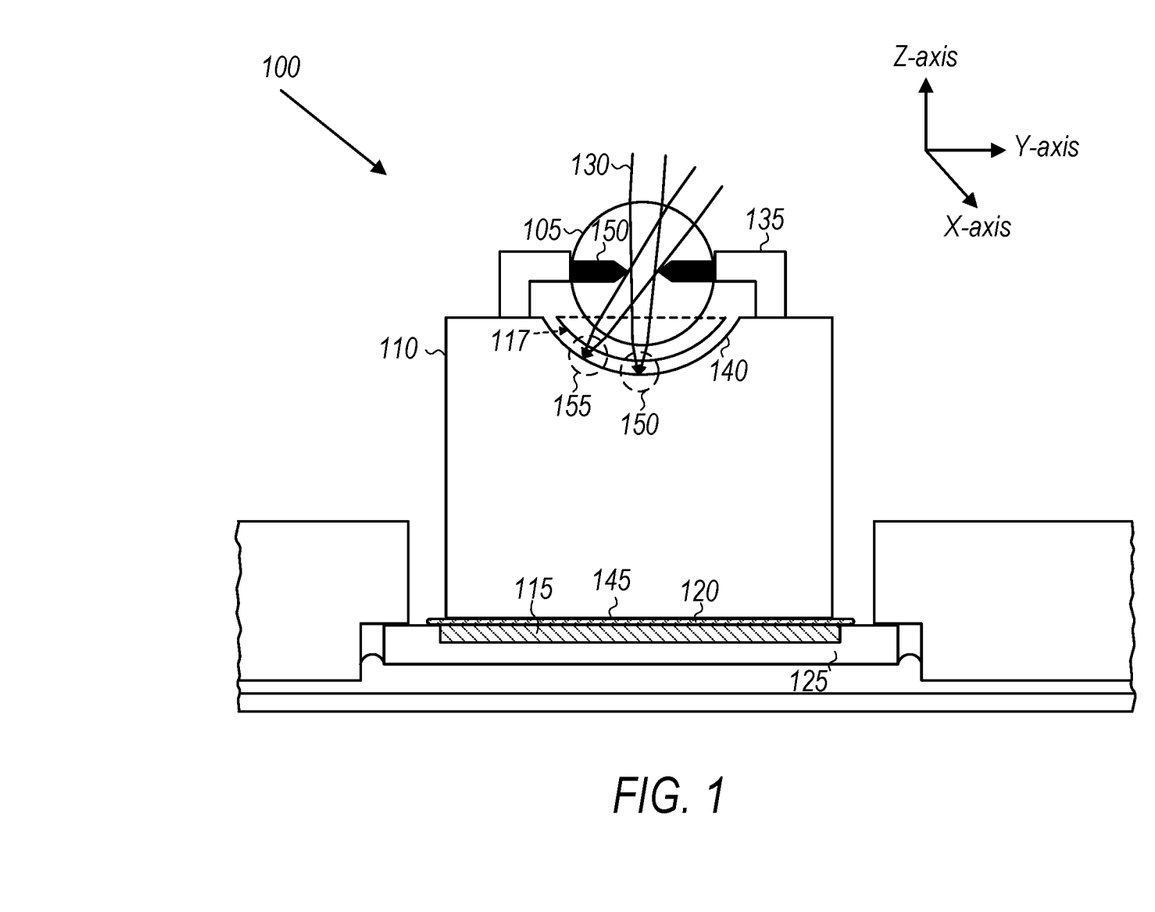
FIG. 1 illustrates a cross-sectional view of an example optical image system, according to some embodiments.

FIG. 1 shows a cross-sectional view of an example optical image system, according to some embodiments. Note that for purposes of illustration, only elements relevant to the descriptions herein are depicted in FIG. 1, and the optical image system may include one or more other optical, electrical, and/or mechanical elements not shown in the figure. As shown in FIG. 1, optical image system 100 may include monocentric lens 105, fiber bundle 110, and image sensor 115. In this example, monocentric lens 105 may be mounted to lens holder 135. The usage of monocentric lens 105 may provide optical image system 100 the ability to capture images in a wide angle, e.g., up to 180°. In some embodiments, monocentric lens 105 may include a ball lens which may further include an internal aperture, e.g., at or near the center of the ball lens. In some embodiments, monocentric lens 105 may be made from light transmissive materials, such as glass. In some embodiments, monocentric lens 105 may include at least one outer shell meniscus and an internal ball lens, e.g., as a multi-glass structure, where the outer shell meniscus may be concentric with the internal ball lens (e.g., sharing a common symmetry center with the internal ball lens). The outer shell meniscus and inner ball lens may be made from the same or different light transmissive materials. For instance, the outer shell meniscus and inner ball lens may both be made from an identical type of glass. Alternatively, the outer shell meniscus may be made from flint glass, whilst the internal ball lens from crown glass. The different materials may provide different light refractive indices for light passing through monocentric lens 105.

The aperture may function analogous to the pupil of a human eye to control the amount of light collected by monocentric lens 105. The aperture may be created in various approaches. For instance, the material of monocentric lens 105 in regions 150 may be grinded away, and then light blocking material may be filled into regions 150 to form the aperture. In another example, monocentric lens 105 may actually include an upper hemispherical ball lens and one lower hemispherical ball lens, two of which may pre-include light blocking material in regions 150 and then be combined together to form monocentric lens 105 with an internal aperture.

In some embodiments, fiber bundle 110 may include one or more sub-bundles each of which may comprise one or more optical fibers. Fiber bundle 110 may function as a waveguide to guide light passing through monocentric lens 105 to image sensor 115. In some embodiments, image sensor 115 may have an approximately flat surface, as shown in FIG. 1. Thus, fiber bundle 110 may be structured to form a fiber faceplate having curved face 140 facing monocentric lens 105 and approximately flat face 145 facing image sensor 115. In some embodiments, flat face 145 may be attached to image sensor 115, e.g., through glue layer 120. As light passes through monocentric lens 105, monocentric lens 105 may focus the light on to a curved image surface or image focus plane, e.g., an approximately spherical image surface (not shown in FIG. 1). In some embodiments, curved face 140 of fiber bundle 110 may be conformal to the curved image surface of monocentric lens 105. In some embodiments, fiber bundle 110 may be positioned at a distance from monocentric lens 105, such that curved face 140 of fiber bundle 110 may coincide with the curved image surface of monocentric lens 105. The coincidence may allow fiber bundle 110 to transfer an image captured by monocentric lens 105 pixel-by-pixel (or fiber-by-fiber) from curved face 140 to flat face 145 and finally to image sensor 115.

In some embodiments, optical image system 100 may include optical correction structure 117. As shown in FIG. 1, optical correction structure 117 may include a curved shell, the surface of which may be conformal to the curved image surface of monocentric lens 105. Optical correction structure 117 may be located between monocentric lens 105 and fiber bundle 110. Optical correction structure 117 may include a diffractive optical element (DOE) which may diffract to cause light rays 130 passing through monocentric lens 105 to bend to reduce incident angles of light rays 130 at curved face 140 of fiber bundle 110 (e.g., to decrease the incident angle by making light rays 130 to become more perpendicular to curved face 140 of fiber bundle 110) so as to reduce or eliminate TIR of light rays 130 at curved face 140. Therefore, the use of optical corrective structure 117 may enhance light in-coupling between monocentric lens 105 and fiber bundle 110 by increasing the amount of light (collected by monocentric lens 105) entering fiber bundle 110.

Also shown in FIG. 1, image sensor 115 may be mounted to image sensor holder 125. For instance, image sensor 115 may be at least partially buried in a silicon substrate of image sensor holder 125. In another example, image sensor 115 may be glued to image sensor holder 125. In some embodiments, image sensor holder 125 may be moveable or fixed with respect an enclosure of optical image system 100. For instance, image sensor holder 125 may be part of an optical image stabilization system, which may shift image sensor 115 with respect to monocentric lens 105, on the X-Y plane orthogonal to the Z-axis or optical axis of monocentric lens 105. In some embodiments, optical image system 100 may be included as part of a camera of a mobile multipurpose device, e.g., a smartphone, tablet, pad, or wearable device.

Without optical correction structure 117, optical image system 110 may be vulnerable to TIR. As shown in FIG. 1, light rays 130 may reach curved face 140 of fiber bundle 110 at various incident angles. For instance, when optical image system 110 does not include optical correction structure 117, the incident angle of light rays 130 may become at or near 0° in region 150, and at or near 60° in region 155. When the incident angle is close to or larger than the critical angle, TIR may occur in which light rays 130 may be reflected from curved face 140 of fiber bundle 110. For instance, assuming the critical angle is 45°, TIR may occur in region 155. Because the TIR weakens the light in-coupling and reduces the amount of light entering fiber bundle 110 from monocentric lens 105, an image corresponding to light rays 130 within region 150 may have a better quality than an image captured by light rays 130 within region 155. In an extreme case, the image corresponding to light rays 130 for region 155 may completely get lost, and thus the field of view of optical image system 100 may get reduced. In short, the TIR may reduce the field of view and/or lower image quality of optical image system 100. In addition, different regions of curved face 140 of fiber bundle 110 may have different levels of vulnerability to TIR, depending on the critical angle and incident angles of respective light rays. In this example of FIG. 1, an outer region or perimetric region of curved face 140 of fiber bundle 110 (e.g., region 155) may be prone to TIR, because the light at the region may have an incident angle larger than the critical angle, whilst a central region or a region at or near the center of curved face 140 of fiber bundle 110 (e.g., region 150) may not be necessarily subject to TIR.

Figure 2:
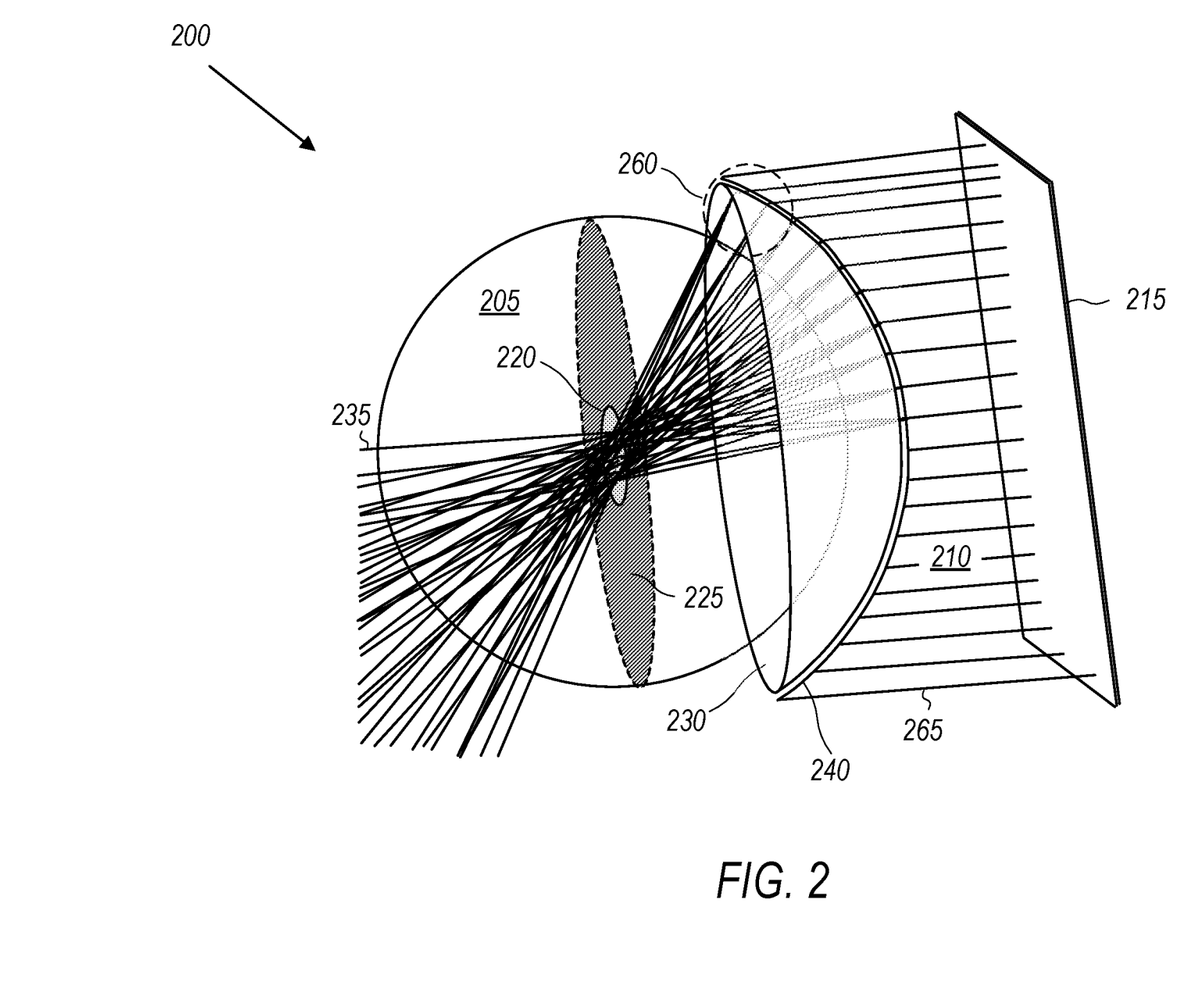
FIG. 2 illustrates an example optical image system that may include an optical correction structure for enhancing light in-coupling between monocentric lens and fiber bundle, according to some embodiments.

FIG. 2 shows an example optical image system that may include an optical correction structure for enhancing light in-coupling between monocentric lens and fiber bundle, according to some embodiments. As shown in FIG. 2, optical image system 200 may include monocentric lens 205, fiber bundle 210, and image sensor 215. In this example, monocentric lens 205 may include a ball lens which may have an internal aperture 220 inside annular light blocking regions 225. Fiber bundle 210 may comprise one or more optical fibers 265, which may be structured to provide curved face 240 towards monocentric lens 205 (which may be conformal to a curved image surface of monocentric lens 205) and an approximately flat face towards image sensor 215. As described above, fiber bundle 215 may function as a link to transfer light rays 235 passing through monocentric lens 205 (which may have a curved image surface, e.g., an approximately spherical image surface) to image sensor 215 (which may have an approximately flat surface).

Figure 3:
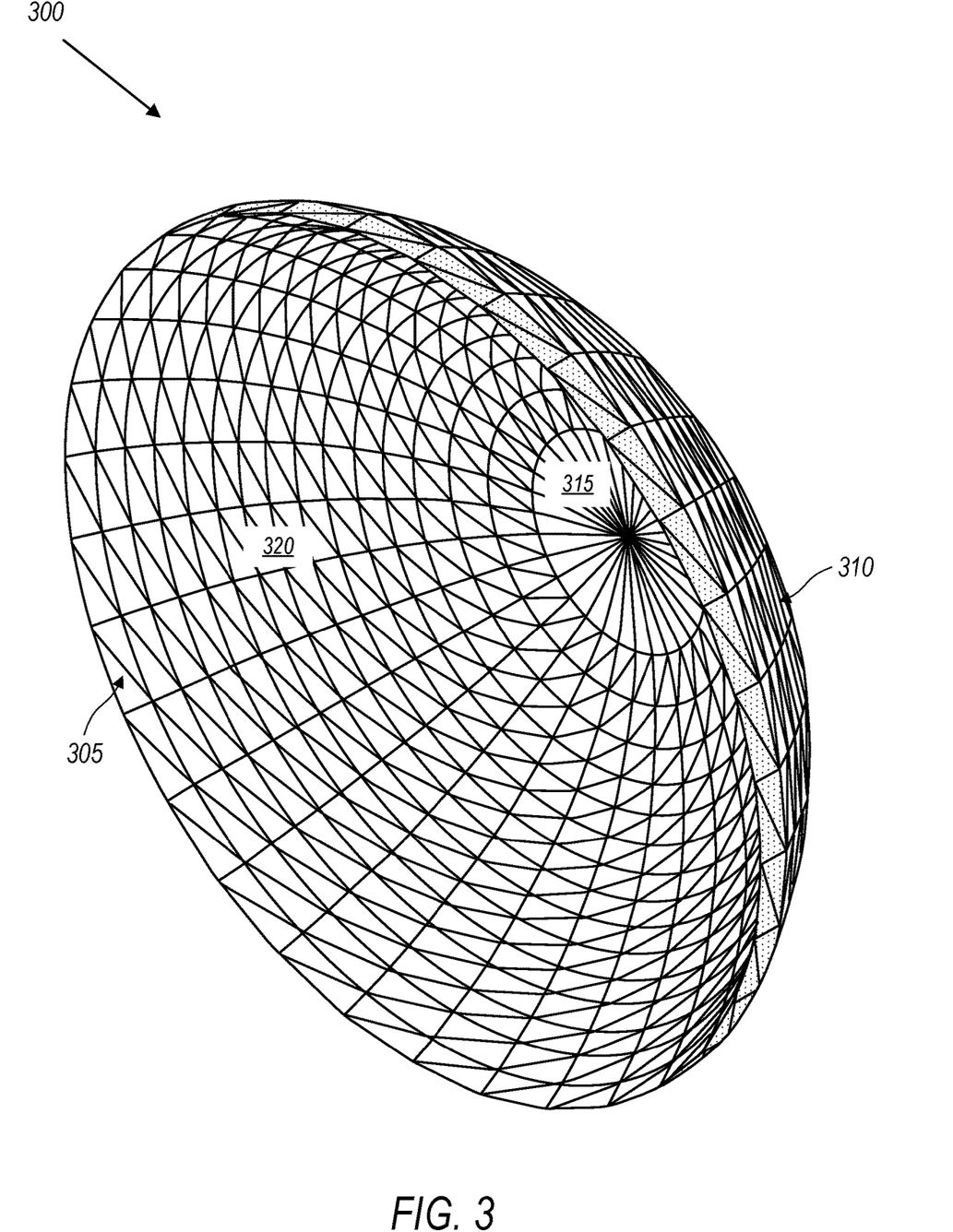
FIG. 3 illustrates an example optical correction structure including a diffractive optical element (DOE), according to some embodiments.

As described above, light rays 235 passing through monocentric lens 205 may be subject to TIR at curved face 240 of fiber bundle 210, e.g., in region 260 at or near the edge of curved face 240, when the incident angles of light rays 235 in region 260 are close to or greater than the critical angle. Therefore, to mitigate or eliminate the TIR, optical image system 200 may further include optical correction structure 230. Optical correction structure 230 may be placed or inserted between monocentric lens 205 and fiber bundle 210 to perform optical corrections to the light rays 235. In some embodiments, optical correction structure 230 may be implemented as a curved shell, whose curved surface may be conformal to the curved image surface of monocentric lens 205, as shown in FIG. 2. In some embodiments, optical correction structure 230 may be made from light transmissive material and include a diffractive optical element or DOE (as shown in FIG. 3) grated on top of or at least partially inside the light transmissive material (e.g., to form a diffraction grating). The DOE may diffract at least some light rays 235 passing through optical correction structure 230 from monocentric lens 205 to curved face 240 of fiber bundle 210 so as to reduce incident angles of those light rays 235 to mitigate or eliminate TIR. In some embodiments, it may be desired for optical correction structure 230 including the DOE to have a minimal thickness. For instance, optical correction structure 230 may be a thin shell having a thickness of a few tens of micrometers up to a few hundred micrometers and a lateral dimension (e.g., a diameter of the shell) of as low as a few micrometers or possibly larger as needed. This may allow optical correction structure 230 including the DOE to provide the designed light correction but with a minimal perturbation to the light transmission such that the curved image surface (or image focus plane) of monocentric lens 205 may still stay close to or at the original location—e.g., curved face 240 of fiber bundle 210—as in the case without optical correction structure 230 including the DOE. By comparison, other technologies such as microprism arrays which refract (not diffract) light passing through the microprism arrays generally have a much larger size in order to produce the required refraction and thus cannot achieve the same level of performance as optical correction structure 230 including the DOE. For instance, a microprism array generally has a thickness ranging from a few hundreds of micrometers to a few centimeters and a lateral dimension in an order of magnitude similar as the thickness. The size difference can significantly impact the feasibility of integrating an optical image system (e.g., optical image system 200 including optical correction structure 230) in a small form factor device. In some embodiments, the phase map of the DOE may be designed or optimized to render various diffractive characteristics, e.g., according to the spatial relationship between monocentric lens 204, optical correction structure 230, and/or fiber bundle 210. In addition, the design or optimization of the phase map of the DOE may take into consideration the bandwidths of individual light rays 235.

FIG. 3 shows an example optical correction structure including a DOE, according to some embodiments. In some embodiments, optical correction structure 300 may be structured in the shape of a curved shell, as shown in FIG. 3. In some embodiments, the curved surface of optical correction structure 300 may be conformal to the curved image surface of a monocentric lens of the optical image system. As described above, optical correction structure 300 may be made from light transmissive material and further include a diffractive optical element (DOE) grated on top of or at least partially inside the light transmissive material (e.g., to form a diffraction grating), which may diffract at least some light passing through the monocentric lens to a fiber bundle of the optical image system in order to mitigate or eliminate TIR. In some embodiments, the DOE may be located at one side or both sides of optical correction structure 300. For instance, the DOE may be located only at side 305 of optical correction structure 300, which may face the monocentric lens (or facing the fiber bundle), whilst the other side (e.g., side 310) of optical correction structure 300 may be smooth without the DOE. In another example, the DOE may be applied to both sides 305 and 310 of optical correction structure 300, which may respectively face the monocentric lens and the curved face of the fiber bundle.

In addition, as described above, not the entire curved face of the fiber bundle may necessarily be equally subject to TIR. Therefore, in some embodiments, the DOE may be located only at a partial region of one side (e.g., side 305) or both sides (e.g., sides 305 and 310) of optical correction structure 300. For instance, as described, in some examples, an outer region or perimetric region at or near the edge of the curved face of the fiber bundle may be vulnerable to TIR because the incident angle of the light in this region may be greater than the critical angle, whilst a central region at or near the center of the curved face of the fiber bundle may not be necessarily at the risk of TIR. Accordingly, the DOE may be located only at the corresponding outer annular region 320, outside central region 315, at one side (e.g., side 305 or side 310) or both sides (e.g., sides 305 and 310) of optical correction structure 300. In some embodiments, an alternative approach may be to create a hole at or near the center of optical correction structure 300 (e.g., region 315 may correspond to a hole) and use the DOE at the remaining region of optical correction structure 300 at one side (e.g., side 305 or side 310) or both sides (e.g., sides 305 and 310). This way, some light from the monocentric lens may pass through the hole (at or near the center) and reach the fiber bundle directly, whilst the other light may be diffracted by the DOE of optical correction structure 300 (outside the hole) before arriving at the curved face of the fiber bundle. In some embodiments, the DOE 300 may not necessarily be designed uniformly for the covered areas of optical correction structure. For instance, when the DOE is located only in outer region 320 at side 305, the phase map of the DOE at different areas of outer region 320 may still be different. For instance, the DOE may be designed such that the degree of diffraction may gradually increase from an area within outer region 320 which is relatively close to the center of optical correction structure 300 (to provide relatively less light diffraction) to an area within outer region 320 which is relatively close to the edge of optical correction structure 300 (to provide relatively more light diffraction). The diffraction of the light by the DOE of optical correction structure 300 may reduce the incident angle of the light so that the TIR may be reduced or eliminated.

Figure 4A:
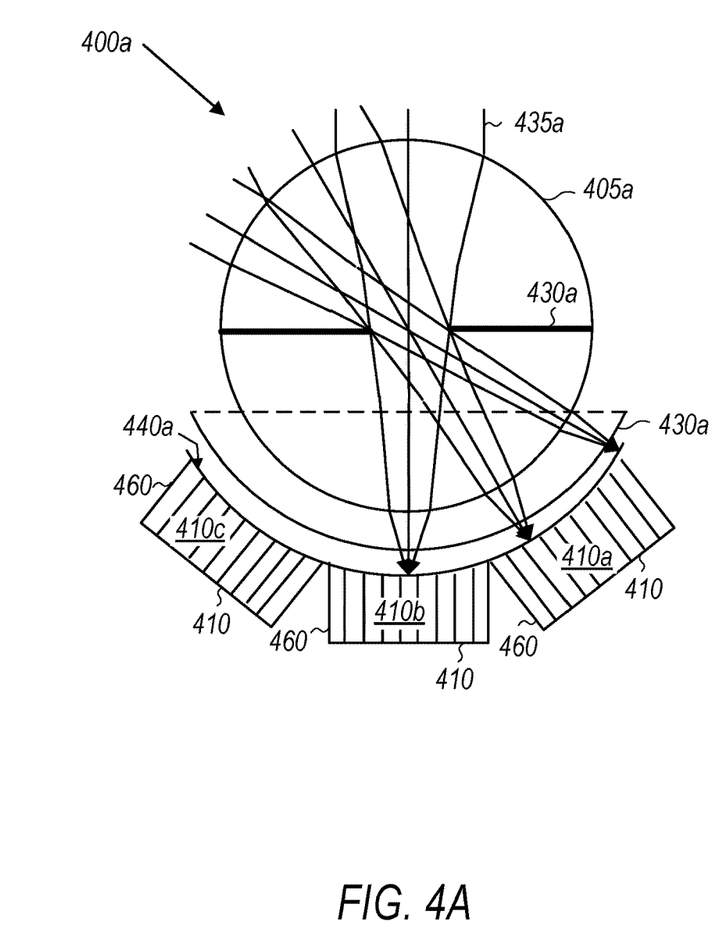
FIG. 4A illustrates an example optical image system that may include an optical correction structure and a fiber bundle having tessellated optical fibers, according to some embodiments.

FIG. 4A shows an example optical image system that may include an optical correction structure and a fiber bundle having tessellated optical fibers, according to some embodiments. As shown in FIG. 4A, optical image system 400a may include monocentric lens 405a, fiber bundle 410, and optical correction structure 430a. In this example, monocentric lens 405a may include a ball lens. As described above, monocentric lens may also include a two-glass structure having at least one outer shell meniscus and an internal ball lens, two of which may be concentric with each other (e.g., sharing a common symmetry center) and may be made from the same or different light transmissive materials. In addition, monocentric lens 405a may include an internal aperture at or near the center of monocentric lens 405a surrounded by annular light blocking regions 425a. Fiber bundle 410 may include one or more sub-bundles 410a, 410b and 410c, each of which may include one or more optical fibers 460. Fiber bundle 410 (e.g., sub-bundles 410a-410c) may be structured so as to form a fiber faceplate which may have curved face 440a towards monocentric lens 405a. In some embodiments, curved face 440a of fiber bundle 410 may be conformal to a curved image surface of monocentric lens 405a. Optical image system 400a may include optical correction structure 430a which may include a curved shell whose surface may be conformal to the curved image surface of monocentric lens 405a. Optical correction structure 430a may include a diffractive optical element (DOE) which may diffract light rays 435a coming out of monocentric lens 405a and passing through optical correction structure 430a so as to reduce incident angles of light rays 435a at curved face 440a of fiber bundle 410 in order to reduce or eliminate TIR.

In some embodiments, the design of fiber bundle 410 (e.g., sub-bundles 410a-410c) may be designed or optimized to reduce or eliminate TIR. For instance, as shown in FIG. 4A, sub-bundles 410a-410c may be tessellated on curved face 440a of fiber bundle 410, such that optical fibers at or near the edge of curved face 440a (e.g., optical fibers 460 of sub-bundles 410a and 410c) may rotate to a direction to face more straight towards the center of monocentric lens 405a. Optical fibers 460 of fiber bundle 410 may still use straight fibers but be positioned in a more direct orientation towards the center of monocentric lens 405a. Therefore, besides the diffraction by the DOE of optical correction structure 430a, the incident angles of light rays 435a with respect to optical fibers 460 (of sub-bundles 410a and 410c) may be further reduced. This may thus further reduce TIR and strengthen the light in-coupling between monocentric lens 405a and fiber bundle 410. In the example of FIG. 4A, because sub-bundles 410a-410c may use straight optical fibers 460 (e.g., optical fibers which may guide the light along a straight path), sub-bundles 410a-410b may not necessarily bundled together in to one single bundle to provide an approximately flat face towards one single image sensor. Instead, sub-bundles 410a-410c may each optically couple with a corresponding image sensor. Thus, optical image system 400a may include one or more image sensors (e.g., three image sensors), each of which may have an approximately flat surface to receive the light signal transferred from the corresponding sub-bundle (e.g., sub-bundles 410a, 410b, and 410c, respectively).

Figure 4B:
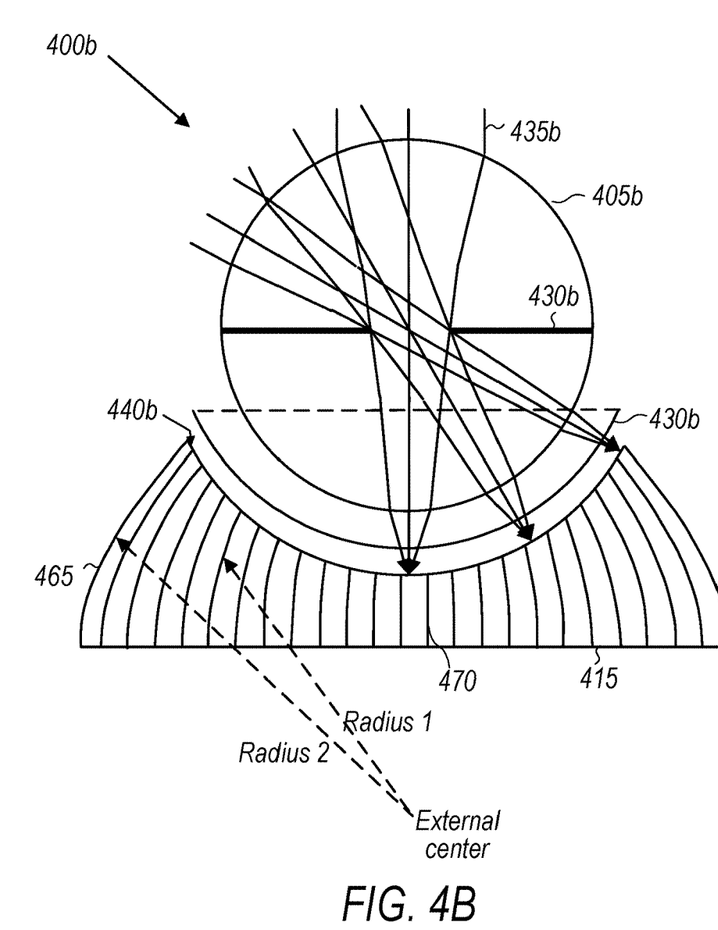
FIG. 4B illustrates an example optical image system that may include an optical correction structure and a fiber bundle having at least some tapered optical fibers, according to some embodiments.

FIG. 4B shows an example optical image system that may include an optical correction structure and a fiber bundle having at least some tapered optical fibers, according to some embodiments. As shown in FIG. 4B, optical image system 400b may include monocentric lens 405b, fiber bundle 415, and optical correction structure 430b. The structure of monocentric lens 405b may be similar to that of monocentric lens 405a in FIG. 4A. For instance, monocentric lens 405b may include a ball lens, and an internal aperture at or near the center of monocentric lens 405b inside annular light blocking regions 425b. Fiber bundle 415 may be structured so as to form a fiber faceplate which may have curved face 440b towards monocentric lens 405b. In some embodiments, curved face 440b of fiber bundle 415 may be conformal to a curved image surface of monocentric lens 405b.

In some embodiments, optical image system 400b may include optical correction structure 430b which may include a curved shell whose surface may be conformal to the curved image surface of monocentric lens 405b. Optical correction structure 430b may include a diffractive optical element (DOE) which may diffract light rays 435b coming out of monocentric lens 405b and passing through optical correction structure 430b so as to reduce or eliminate TIR at curved face 440b of fiber bundle 415. In this example shown in FIG. 4B, fiber bundle 415 may include at least some tapered optical fibers (e.g., optical fibers 465), which may provide a curved light transmissive path, and at least some straight or non-tapered optical fibers (e.g., optical fibers 470), which may provide a straight light transmissive path. Tapered optical fibers 465 and straight optical fibers 470 may be bundled together to form one single fiber bundle 415 so as to provide curved face 440a which may be conformal to the curved image surface of monocentric lens 405b and an approximately flat face towards an image sensor. As shown in FIG. 4B, the radius of tapered optical fibers 465 with respect to an external center may vary from center (e.g., radius 1) to edge (e.g., radius 2). In addition, the cross-sectional size of tapered optical fiber 465 may vary from one end to the other end, e.g., the cross-sectional size may diminish (or enlarge) from one end to the other end of optical fiber 465 (e.g., the cross-sectional size of tapered optical fiber 465 may diminish from curved face 440b to the flat face of fiber bundle 415 facing the image sensor, or vice versa), whilst the cross-sectional size of straight or non-tapered optical fiber 470 may remain constant or near constant. Note that the extent of tapering of optical fibers 465 may vary depending on the design of the optical images systems, e.g., based at least in part on characteristics of the ball lens, the optical correction structure, and/or the image sensor.

Figure 5:
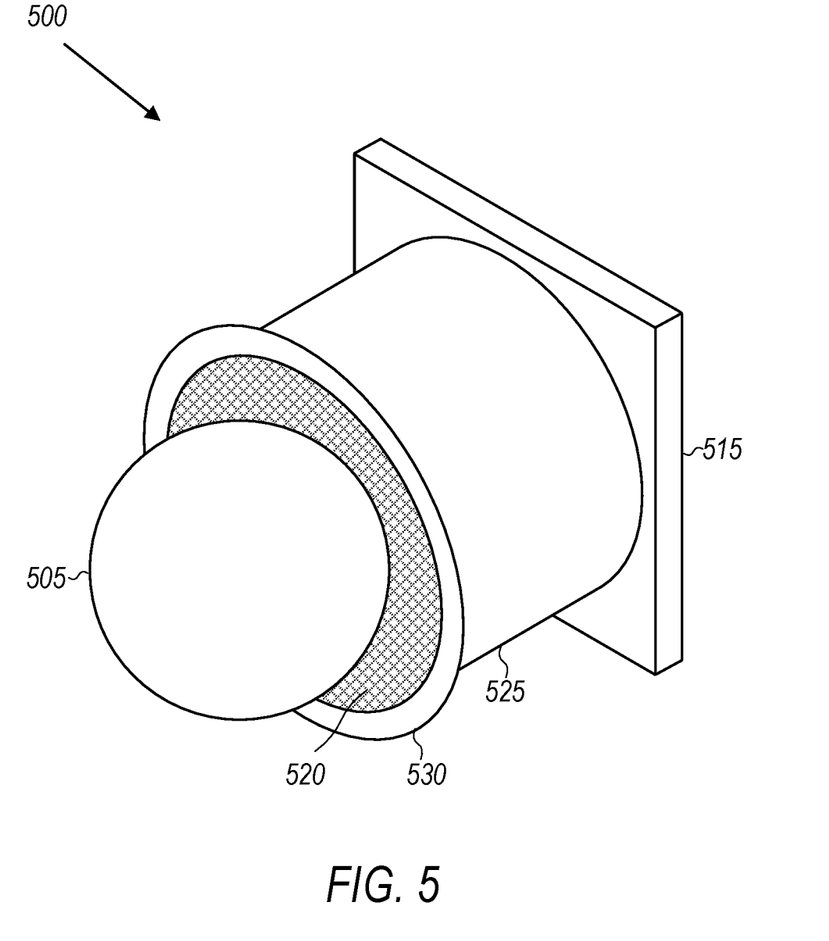
FIG. 5 illustrates an example structure for the integration of an optical correction structure in an optical image system, according to some embodiments.

FIG. 5 shows an example structure for the integration of an optical correction structure in an optical image system, according to some embodiments. In this example, optical image system 500 may include monocentric lens 505, a fiber bundle (not visible), image sensor 515, and optical correction structure 520. In some embodiments, optical correction structure 520 may be located between monocentric lens 505 and the fiber bundle. In some embodiments, optical image system 500 may include non-optical structure 525 for integrating optical correction structure 520 in optical image system 500. For instance, non-optical structure 525 may include a cylindrical or tube structure which may function as a container to hold the fiber bundle of optical image system 500, as shown in FIG. 5. In addition, non-optical structure 525 may include connection structure 530, e.g., a flange, which may function as part of a holder to mount optical correction structure 520 on to non-optical structure 525. Optical image system 500 may include one or more additional structures (not shown), such as lens holder 135, image sensor holder 125, and/or glue layer 120 in FIG. 1, to integrate monocentric lens 505 and image sensor 515 in to optical image system 500.

Figure 6:
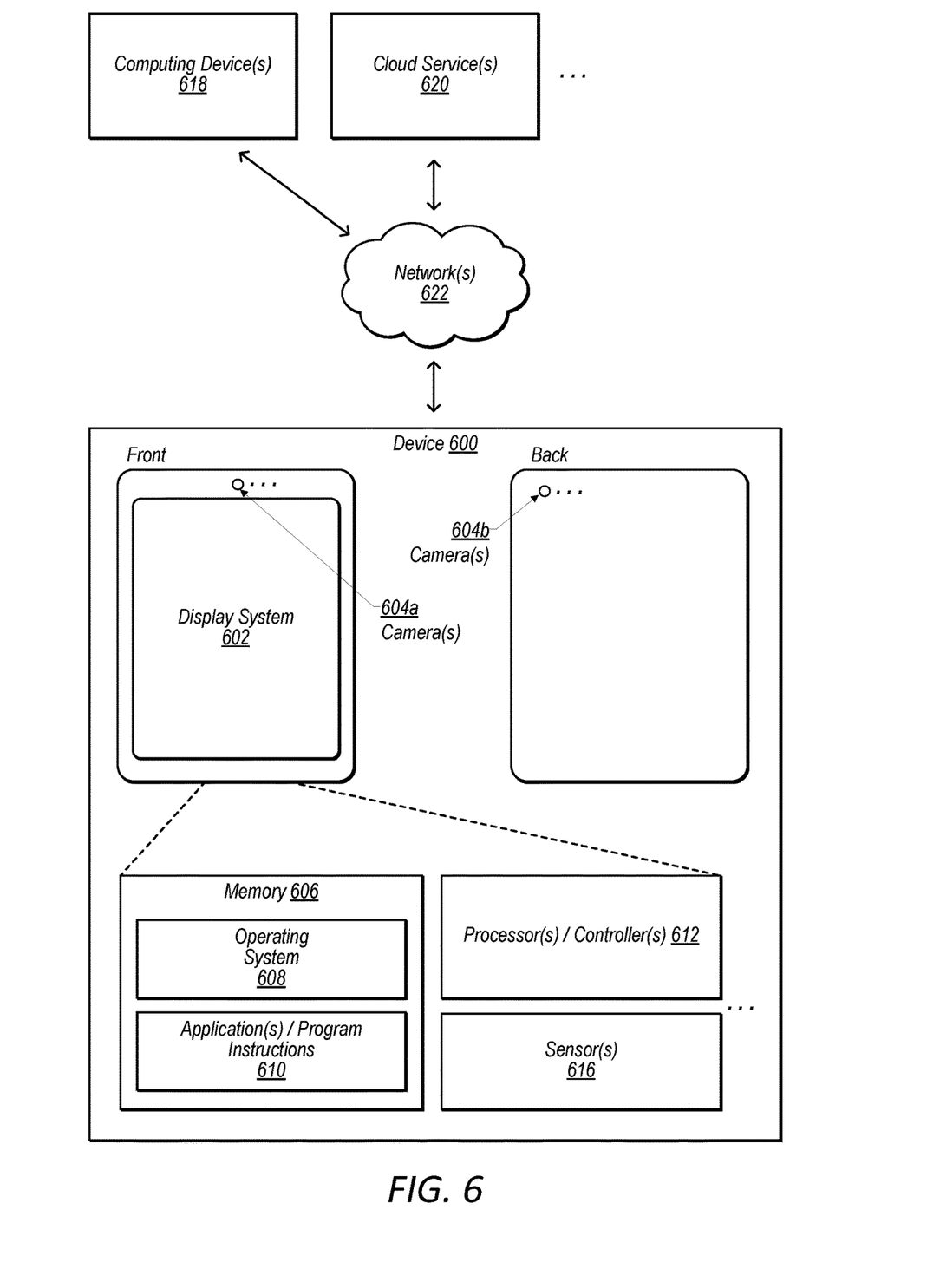
FIG. 6 illustrates a schematic representation of an example device that may include an optical image system integrated as part of a camera of the example device, according to some embodiments.

FIG. 6 illustrates a schematic representation of an example device that may include an optical image sensor integrated as part of a camera of the example device, according to some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 710) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
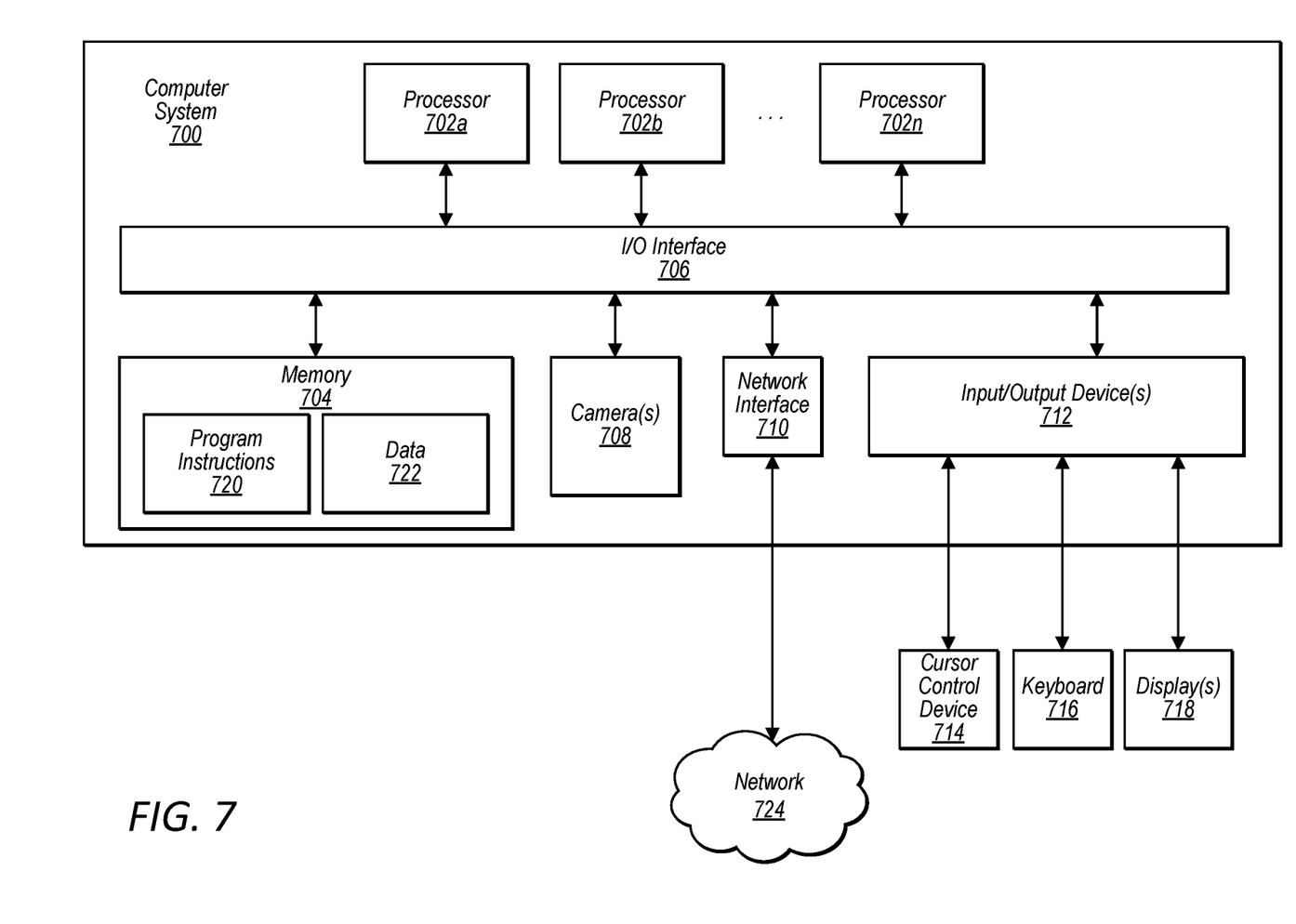
FIG. 7 illustrates a schematic block diagram of an example computer system that may include a camera having an optical image system, according to some embodiments.

FIG. 7 illustrates a schematic block diagram of an example computing device, referred to as computer system 700, that may include or host embodiments of an optical image system, e.g., as described herein with reference to FIGS. 1-6, according to some embodiments. In addition, computer system 700 may implement methods for controlling operations of the camera and/or for performing image processing images captured with the camera. In some embodiments, the device 600 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments, processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image system, comprising:
   a ball lens;
   an optical correction structure including a diffractive optical element, wherein the optical correction structure includes a hole located at a central region of the optical correction structure;
   a fiber bundle including one or more optical fibers;
   an image sensor,
   wherein the optical correction structure is configured such that the diffractive optical element diffracts at least some of light passing through the ball lens to the fiber bundle, and
   wherein the fiber bundle is configured to guide the at least some of light passing through the ball lens to the image sensor.

2. The image system of claim 1, wherein the fiber bundle is configured to provide a curved side facing the ball lens, and wherein the curved side is conformal to a spherical image surface of the ball lens.

3. The image system of claim 1, wherein the fiber bundle is configured to provide a flat side facing the image sensor.

4. The image system of claim 1, wherein the optical correction structure includes a curved shell comprising a surface that is conformal to a spherical image surface of the ball lens.

5. The image system of claim 1, wherein the diffractive optical element is located at one side of the optical correction structure that faces the ball lens.

6. The image system of claim 1, wherein the diffractive optical element is located in a region outside the central region at two sides of the optical correction structure that respectively face the ball lens and the fiber bundle.

7. The image system of claim 1, wherein the fiber bundle includes at least one optical fiber having a tapered shape so as to guide the at least some of light along a curved path to the image sensor.

8. The image system of claim 1, wherein the fiber bundle includes at least one optical fiber having a straight shape so as to guide the at least some of light along a straight path to the image sensor.

9. The image system of claim 1, wherein the ball lens includes an internal aperture.

10. The image system of claim 1, wherein the ball lens includes an outer shell meniscus and an internal optical correction ball.

11. A device, comprising:
    an image system, including:
      a monocentric lens configured to pass through light;
      an image sensor;
      a fiber bundle; and
      an optical correction structure including a diffractive optical element located in a region outside a central region at two sides of the optical correction structure that respectively face the monocentric lens and the fiber bundle,
      wherein the optical correction structure is configured such that the diffractive optical element diffracts at least some of the light having passed through the monocentric lens to the fiber bundle,
      wherein the fiber bundle is configured to guide the at least some of the light diffracted by the optical correction structure to the image sensor, and wherein the image sensor is configured to generate image signals based at least in part on the at least some of the light from the fiber bundle; and at least one processor configured to process the image signals to determine an image.

12. The device of claim 11, wherein the fiber bundle is configured to provide a curved side facing the monocentric lens, wherein the curved side is conformal to a curved image surface of the monocentric lens, and wherein the fiber bundle is configured to provide a flat side facing the image sensor.

13. The device of claim 11, wherein the optical correction structure includes a curved shell comprising a surface that is conformal to a curved image surface of the monocentric lens.

14. The device of claim 11, wherein the diffractive optical element is located at one side of the optical correction structure that faces the monocentric lens.

15. The device of claim 11, wherein the fiber bundle includes at least one optical fiber having a tapered shape so as to guide the at least some of the light along a curved path to the image sensor.

16. The device of claim 11, wherein the fiber bundle includes at least one optical fiber having a straight shape so as to guide the at least some of the light along a straight path to the image sensor.

17. A method for transferring light in a camera, comprising:

diffracting, using an optical correction structure, at least some of light having passed through a monocentric lens to a fiber bundle, wherein the optical correction structure:
  includes a diffractive optical element located in a region outside a central region at two sides of the optical correction structure that respectively face the monocentric lens and the fiber bundle; or
  includes a hole located at the central region of the optical correction structure;
wherein the optical correction structure is configured to diffract the at least some of light so as to increase light in-coupling between the monocentric lens and the fiber bundle, relative to other light in-coupling that would occur between the monocentric lens and the fiber bundle without diffracting the at least some of light using the optical correction structure; and
transferring, using the fiber bundle, the at least some of light from the optical correction structure to an image sensor.

18. The method of claim 17, wherein the optical correction structure includes a curved shell comprising a surface that is conformal to a curved image surface of the monocentric lens, and wherein the diffractive optical element is located at one side of the optical correction structure that faces the monocentric lens.

* * * * *